US010677078B2

(12) United States Patent
Tse et al.

(10) Patent No.: US 10,677,078 B2
(45) Date of Patent: Jun. 9, 2020

(54) GAS TURBINE WITH A RADIAL-TO-AXIAL INTAKE, VARIABLE-ANGLE INLET GUIDE VANE THEREFORE, AND METHOD OF OPERATION

(71) Applicant: PRATT & WHITNEY CANADA CORP., Longueuil (CA)

(72) Inventors: Man-Chun Tse, Brossard (CA); Sid-Ali Meslioui, Brossard (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 242 days.

(21) Appl. No.: 15/605,341

(22) Filed: May 25, 2017

(65) Prior Publication Data
US 2018/0340434 A1 Nov. 29, 2018

(51) Int. Cl.
F01D 9/04 (2006.01)
F02C 7/042 (2006.01)
F04D 29/70 (2006.01)
F04D 19/02 (2006.01)
F01D 17/16 (2006.01)
(Continued)

(52) U.S. Cl.
CPC ............ F01D 9/048 (2013.01); F01D 5/146 (2013.01); F01D 17/165 (2013.01); F02C 3/145 (2013.01); F02C 7/042 (2013.01); F02C 9/20 (2013.01); F04D 19/02 (2013.01); F04D 29/522 (2013.01); F04D 29/541 (2013.01); F04D 29/701 (2013.01); F05D 2240/122 (2013.01); F05D 2250/182 (2013.01); F05D 2250/51 (2013.01); F05D 2260/961 (2013.01)

(58) Field of Classification Search
CPC combination set(s) only.
See application file for complete search history.

(56) References Cited

U.S. PATENT DOCUMENTS 4,531,356 A 7/1985 Linder
4,844,695 A 7/1989 Banks et al.
(Continued)

FOREIGN PATENT DOCUMENTS

DE 2227460 A1 1/1974

OTHER PUBLICATIONS

Tse, Man-Chun. Vortex Whistle in Radial Intake. Pratt and Whitney Canada Corp Longueuil (Quebec), 2004.

Primary Examiner — Richard A Edgar
Assistant Examiner — Maxime M Adjagbe
(74) Attorney, Agent, or Firm — Alexandre Daoust; Norton Rose Fulbright Canada LLP

(57) ABSTRACT

The gas turbine has a plurality of inlet guide vanes each having a blade having a leading edge, a trailing edge, a span extending along the leading edge, and pivot members at opposite ends of the leading edge, and being pivotally mounted across the radial-to-axial intake via the pivot members, the pivot axis extending axially across a radial portion of the radial-to-axial intake. The plurality of inlet guide vanes include a plurality of first inlet guide vanes, and a plurality of second inlet guide vanes, the second inlet guide vanes having a trailing edge recess differing from the corresponding portion of the first inlet guide vanes. During operation, when the inlet guide vanes are pivoted past a given angle toward the tangential orientation, a radial flow of gas is allowed through the trailing edge recesses to avoid or impede vortex whistle.

20 Claims, 7 Drawing Sheets

(51) Int. Cl.
*F01D 5/14* (2006.01)
*F02C 3/14* (2006.01)
*F04D 29/52* (2006.01)
*F02C 9/20* (2006.01)
*F04D 29/54* (2006.01)

(56) References Cited

U.S. PATENT DOCUMENTS

| | | | |
|---|---|---|---|
| 4,995,786 A | * | 2/1991 | Wheeler ............... F01D 5/141 |
| | | | 415/148 |
| 5,281,087 A | * | 1/1994 | Hines .................. F01D 17/162 |
| | | | 415/160 |
| 5,373,691 A | | 12/1994 | Gardner et al. |
| 5,484,261 A | | 1/1996 | Biscay et al. |
| 9,004,850 B2 | | 4/2015 | Nichols et al. |

* cited by examiner

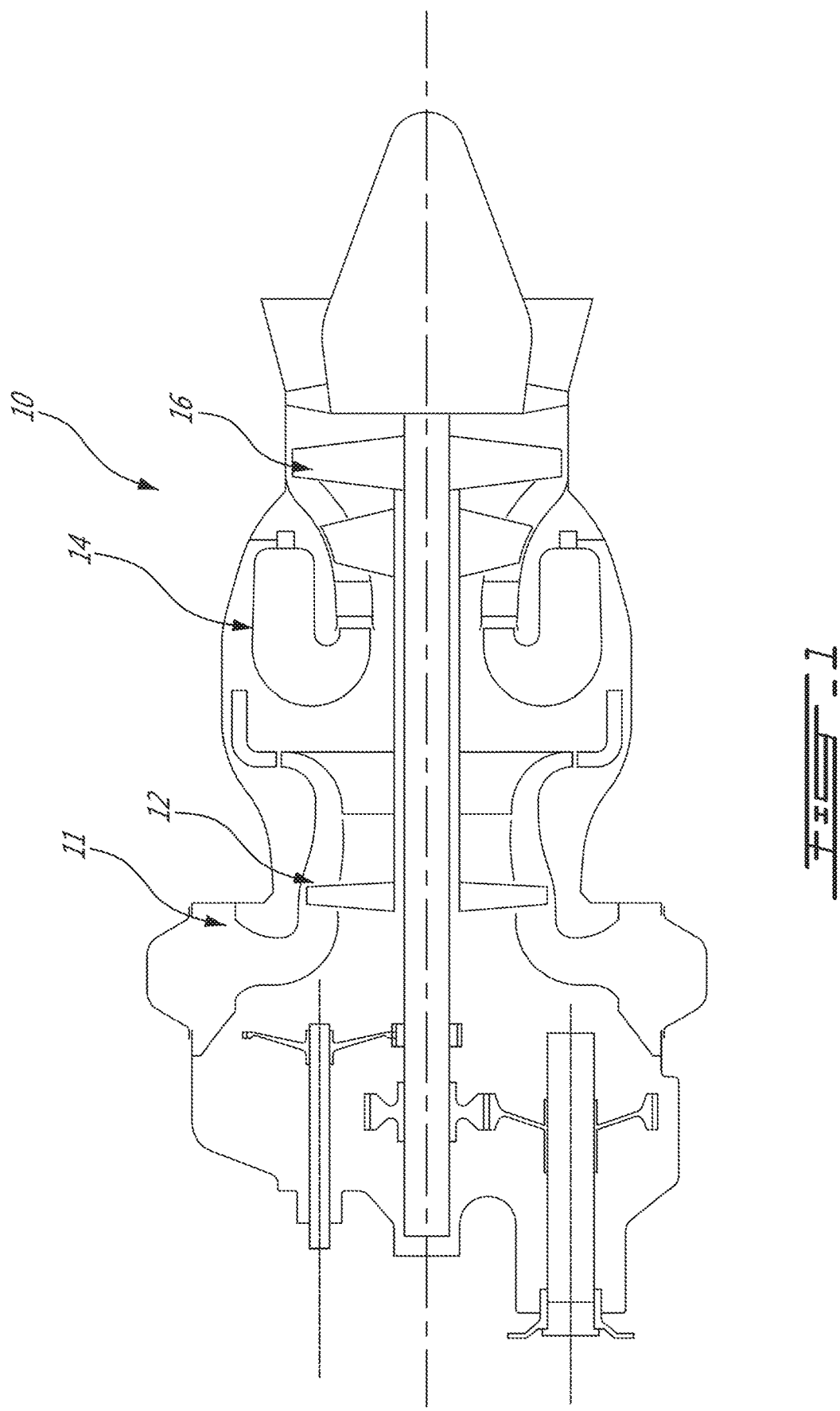

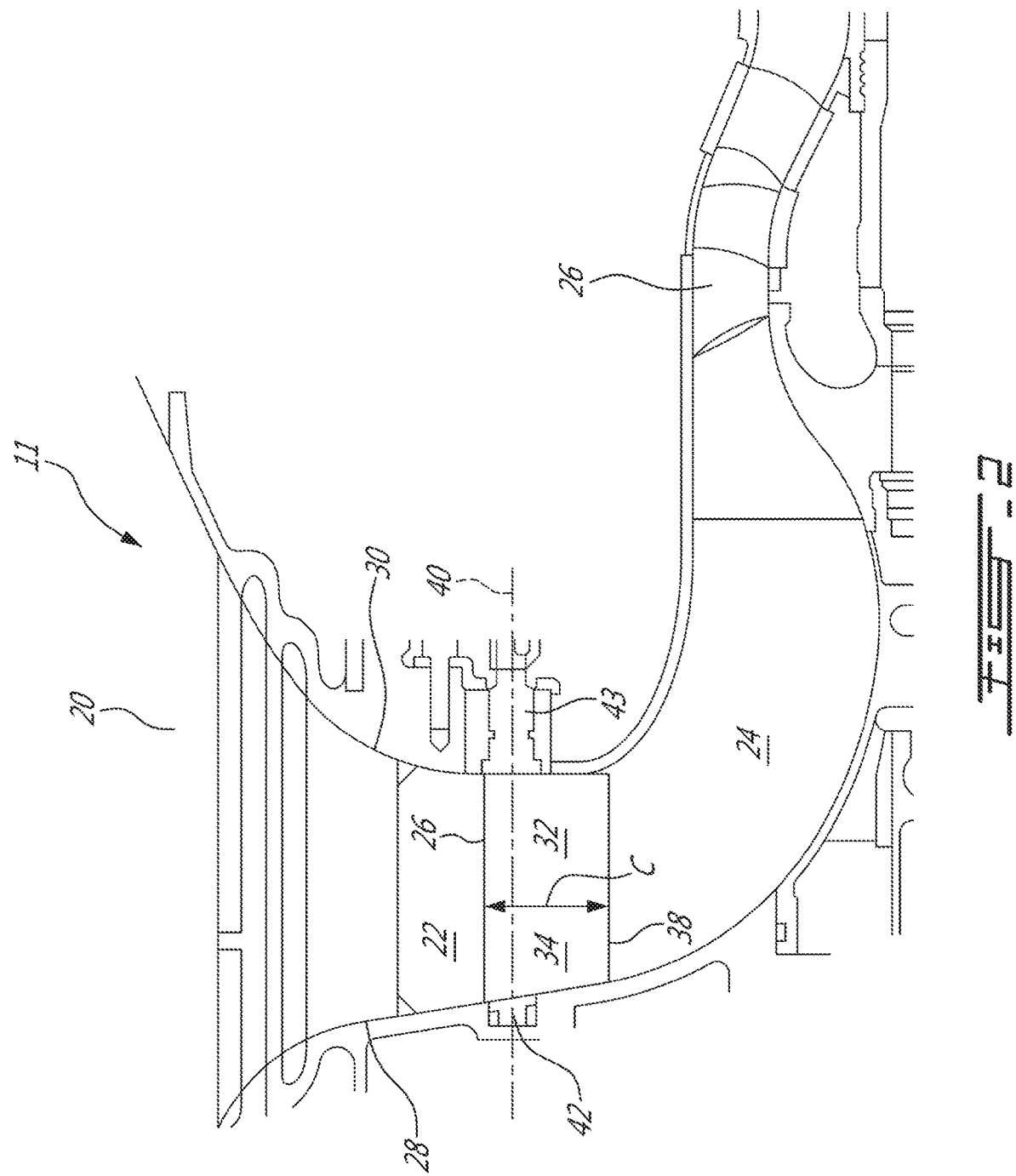

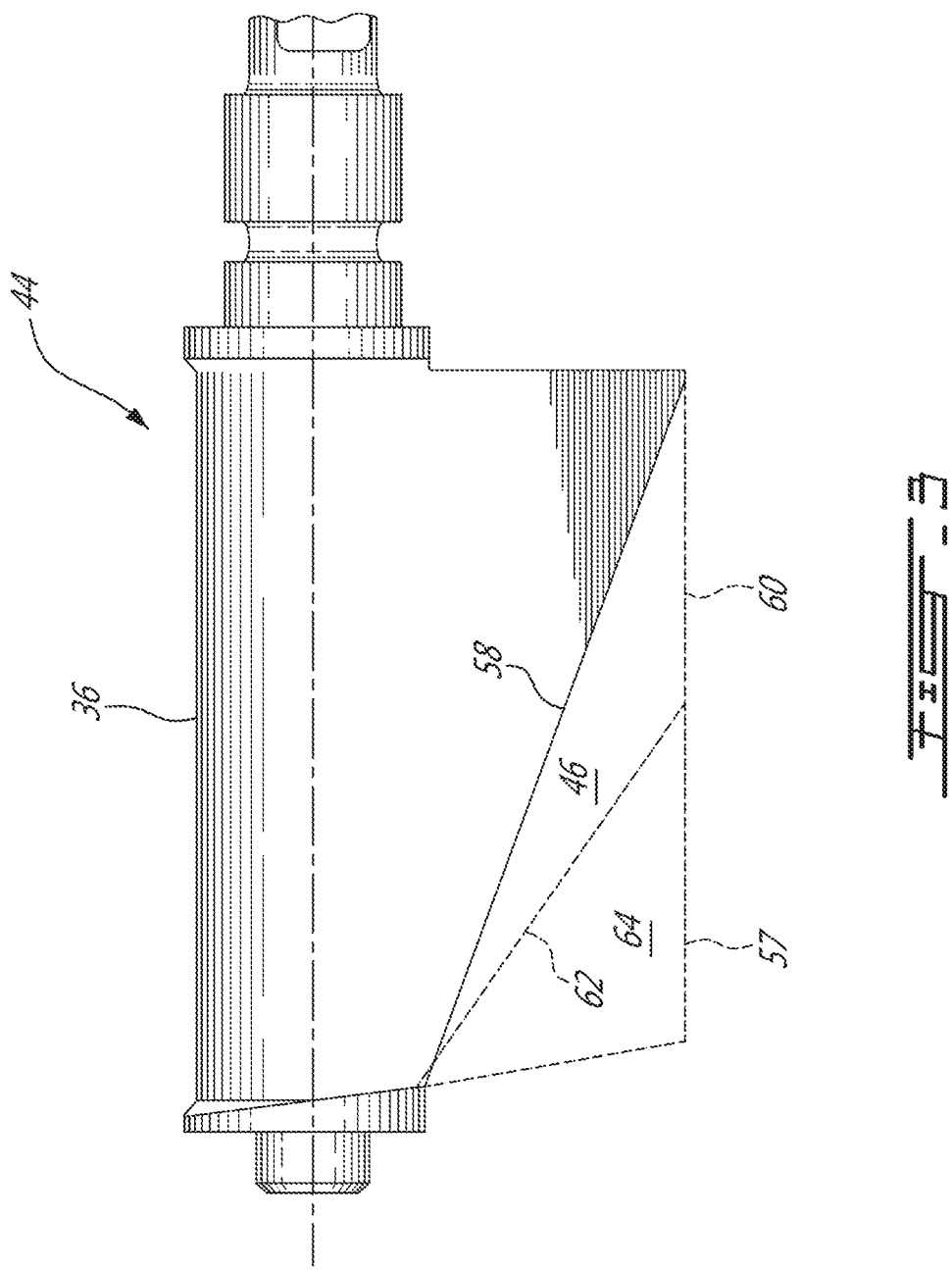

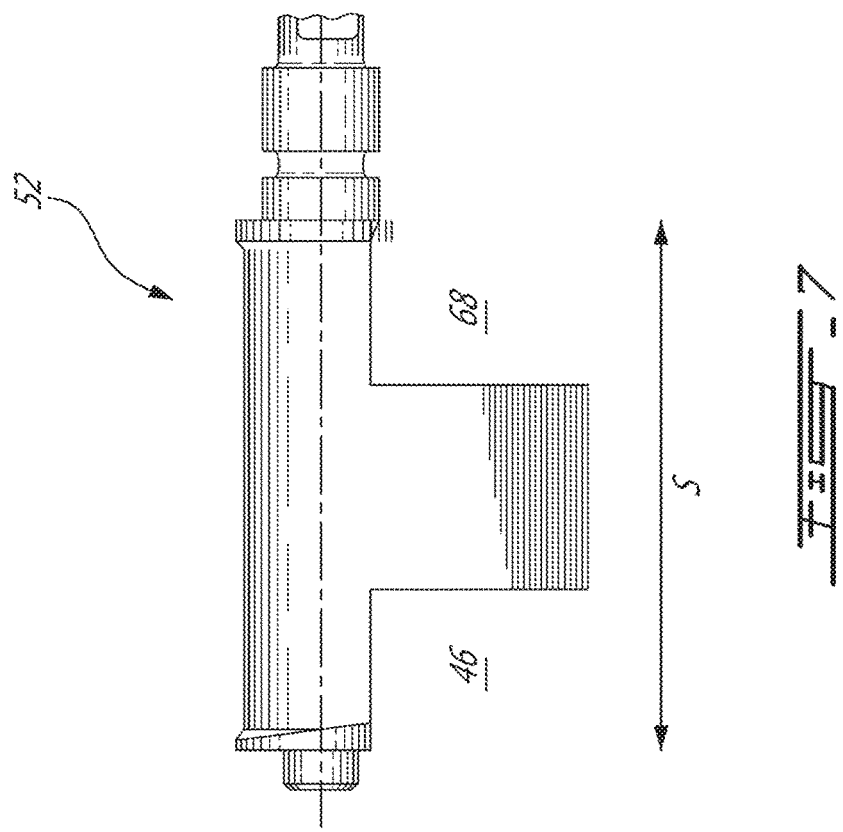
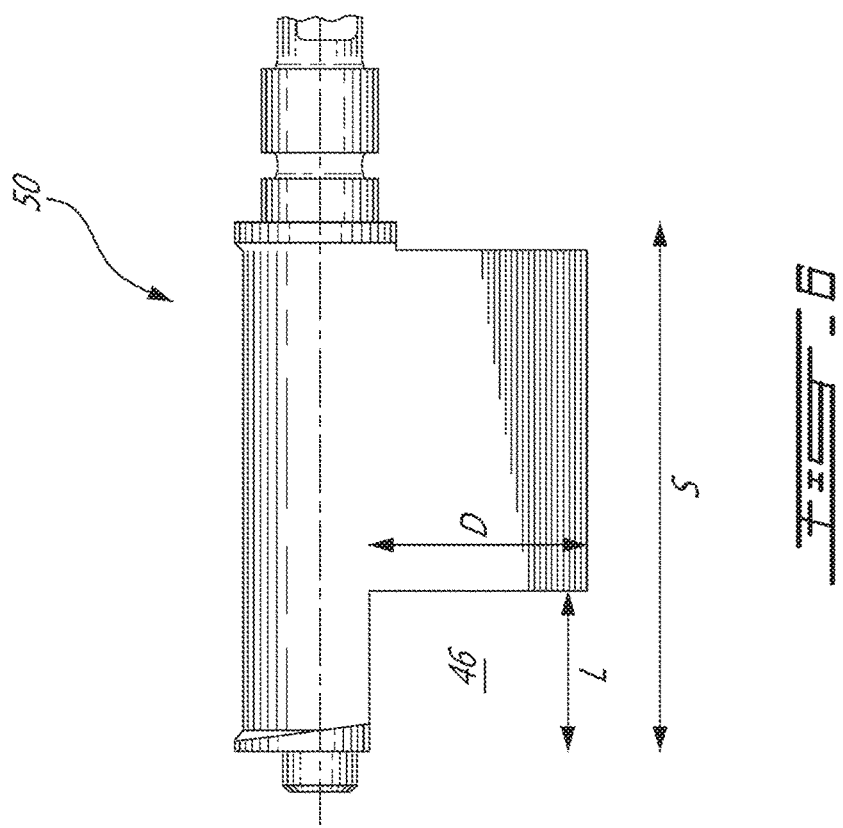

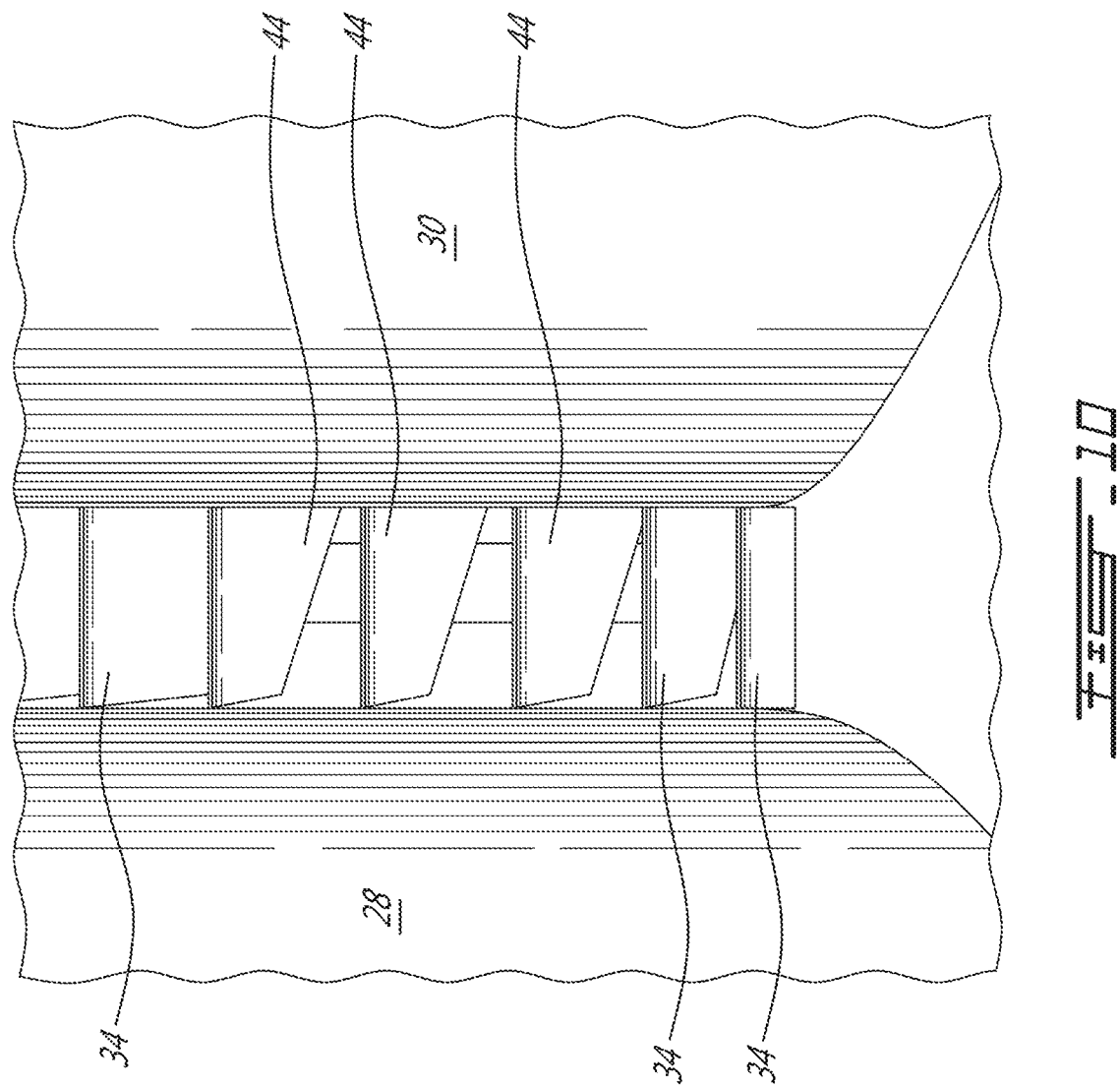

US 10,677,078 B2

GAS TURBINE WITH A RADIAL-TO-AXIAL INTAKE, VARIABLE-ANGLE INLET GUIDE VANE THEREFORE, AND METHOD OF OPERATION

TECHNICAL FIELD

The application relates generally to gas turbines having radial-to-axial intake and, more particularly, to variable-angle inlet guide vanes therefore.

BACKGROUND OF THE ART

It was well known to use variable-angle inlet guide vanes (commonly referred to as variable inlet guide vanes, or VIVGs) in gas turbines having radial-to-axial intake. Changing the angle of the guide vanes, and more specifically the orientation of the trailing edge, between the radial and the tangential (i.e. circumferential) orientations changes the characteristics of the intake flow, which can allow adapting the intake flow to varying operating conditions.

Gas turbine engines or generators with variable-angle inlet guide vanes, such some as turboshafts, auxiliary power units (APUs) and small turboprops for instance, were known to be prone to a noise issue commonly referred to as "whistle". Various approaches were proposed to address occurrences of whistle. While these approaches were satisfactory to a certain extent, there remained room for improvement. In particular, it was found that such former approaches had limited effectiveness in that a) they did not reduce the whistle to a satisfactory level and/or b) they introduced an inconvenient or problematic amount of aerodynamic losses.

SUMMARY

In one aspect, there is provided a gas turbine comprising a radial-to-axial intake extending between a hub and a shroud, a plurality of inlet guide vanes being interspaced from one another around a circumference of the radial-to-axial intake, the plurality of inlet guide vanes each having a blade having a leading edge, a trailing edge, a span extending along the leading edge, and pivot members at opposite ends of the leading edge, and being pivotally mounted across the radial-to-axial intake via the pivot members, the pivot axis extending axially across a radial portion of the radial-to-axial intake; wherein the plurality of inlet guide vanes include a plurality of first inlet guide vanes, and a plurality of second inlet guide vanes, said second inlet guide vanes having a trailing edge shape differing from the corresponding portion of the first inlet guide vanes.

In another aspect, there is provided a method of operating a gas turbine having a radial-to-axial intake extending between a hub and a shroud, a plurality of inlet guide vanes being interspaced from one another around a circumference of the radial-to-axial intake, the method comprising: collectively orienting each one of the plurality of inlet guide vanes in an oblique orientation, between a radial orientation and a tangential orientation; aspiring a tangential flow of gas between corresponding adjacent ones of said inlet guide vanes; and aspiring a radial flow of gas across a trailing edge recess formed in at least one of said plurality of inlet guide vanes.

In a further aspect, there is provided an inlet guide vane comprising a blade having a leading edge, a trailing edge and a span extending along the leading edge; a hub pivot engagement member and a shroud pivot engagement member positioned at opposite ends of the blade, adjacent the leading edge; and a trailing edge recess.

DESCRIPTION OF THE DRAWINGS

Reference is now made to the accompanying figures in which:

FIG. 1 is a schematic cross-sectional view of a gas turbine engine;

FIG. 2 is a cross-sectional view of an example radial-to-axial inlet;

FIG. 3 is a side elevation view of a second inlet guide vane, in accordance with a first embodiment;

FIG. 6 is a side elevation view of a second inlet guide vane, in accordance with a second embodiment;

FIG. 7 is a side elevation view of a second inlet guide vane, in accordance with a third embodiment;

FIG. 10 is a side elevation view of an example radial-to-axial inlet.

DETAILED DESCRIPTION

Figure 5:
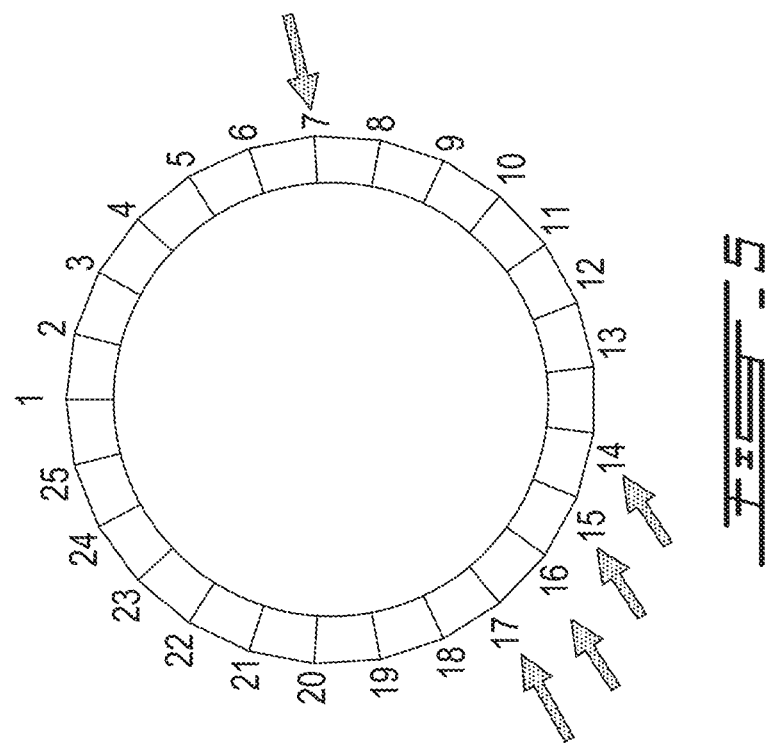
FIG. 4 and FIG. 5 are schematic cross-sectional views showing two example configurations of second inlet guide vanes in a gas turbine.

FIG. 1 illustrates an example of a turbine engine. In this example, the turbine engine 10 is a turboshaft engine generally comprising in serial flow communication, a radial-to-axial intake 11, a multistage compressor 12 for pressurizing the air, a combustor 14 in which the compressed air is mixed with fuel and ignited for generating an annular stream of hot combustion gases, and a turbine section 16 for extracting energy from the combustion gases. The turbine engine terminates in an exhaust section.

An example of a radial-to-axial intake 11 is shown in greater detail in FIG. 2. The radial-to-axial intake 11 extends from an entry 20, along a radial portion 22 and an elbow 24, to an axial portion 26, and the flow area of the gas path is reduced along the way. The gas path extends between a hub 28 and a shroud 30. The intake 11 is equipped with a plurality of variable-angle inlet guide vanes 32 (only one is shown in FIG. 2) which are regularly spaced apart from one another around the circumference of the intake 11. The inlet guide vanes 32 extend across the intake path, and more specifically extend axially across the radial portion 22 of the intake path in this embodiment. Some of the inlet guide vanes 32 will be referred to as first inlet guide vanes 34 having a first trailing edge shape which can be referred to in some embodiments as a 'regular trailing edge shape', and other ones of the inlet guide vanes which have a trailing edge shape which is different from the trailing edge shape of the first trailing edge shape will be referred to as second inlet guide vanes. In FIG. 2, an example first inlet guide vane 34 is shown.

In the embodiment shown in FIG. 2, the first inlet guide vanes 34 have a chord C extending between a leading edge 36 and a trailing edge 38, and the leading edge 36 and the trailing edge 38 are straight and parallel to one another. The guide vanes 34 are pivotally mounted across the gas path, between the hub 28 and the shroud 30, for pivoting the trailing edge 38 about an axially-extending pivot axis 40 which is parallel and adjacent to the leading edge 36, thereby allowing to change the orientation of the chord between the radial (or fully opened, 0° setting) and the tangential (or circumferential—fully closed, ~90° setting) orientations. At the fully closed setting, the guide vanes 34 can almost completely close the intake flow area, but typically still allow a certain amount of leakage flow.

More specifically, the inlet guide vanes 34 have pivot engagement members 42, 43 extending from opposite ends thereof, adjacent the leading edge 36, and which are designed to matingly engage corresponding features provided as part of the hub 28 and of the shroud 30. In this embodiment, the pivot engagement members 42, 43 are male members, but it will be understood that female members could alternately be used in some embodiments. The pivot engagement member designed to engage the hub 28 will be referred to herein as the hub pivot engagement member 42, and the pivot engagement member designed to engage the shroud 30 will be referred to herein as the shroud pivot engagement member 43. A mechanism can be used to collectively and simultaneously change the angle of all the inlet guide vanes 34 around the corresponding pivot axes.

During operation, when the guide vanes 34 are set at an angle deviating from radial (such as shown in FIG. 10), the guide vanes 34 impart an initial tangential velocity Co, creating an amount of initial flow circulation (Γo=2πrCo). This amount of circulation (angular flow momentum) is practically conserved, while being convected downstream from radial to axial. The contracting gaspath flow area leads to increasing the tangential velocity Cu above Co (where Γo=2πRoCo=2πrCu where Ro is distance measured perpendicularly from engine axis to pivot axis 40).

More specifically, a strong flow circulation (Γo) can be generated from the tangential flow components created by the guide vanes 34 when their setting exceed about half-closing (~45°). The circulation is convected downstream in the gaspath. As the flow area of the gaspath is reduced towards the axial-exit, the initial circulation (Γo) is stretched. This increases vorticity intensity as a result of conservation of circulation (angular momentum), can lead to a strong audible vortex whistle tone when the velocity ratio Cu/Cx (Cu: tangential flow component, Cx: axial flow component) exceeds a critical value. Testing led to estimating that this critical velocity ratio can be around √3 when the values of peak Cu/mean Cx were used. The vortex whistle phenomenon is associated to an intense rotating shear (Reynolds shear stress) action in the swirling flow, and can depend on the guide vane angle and on the mass flow. In many gas turbine engine configurations, the exceeding of the critical Cu/Cx ratio can occur approximately at mid-gaspath, between the trailing edge of the guide vanes and the leading edge of the rotor.

Sound is typically generated when a vortex line is stretched or accelerated relative to the acoustic medium. In a radial-to-axial intake, the flow area contraction towards the axial exit provides impact to flow acceleration and stretching the vortex line. Hence, it can lead to vortex whistle tone.

When considering the effect of the bodies (guide vanes, gaspath walls) on the fluid medium (intake air), two effects can be considered. First, the bodies can alter the sound pressure field radiated from turbulent sources by acting as a scattering or diffracting surface. Second, the bodies can alter the flow itself by creating additional flow disturbances in the form of vortices. Accordingly, it is possible to control the swirling flow energy by the configuration of the bodies (guide vanes or gaspath walls) to address whistle. However, care must be taken to minimize the potential trade-off of aerodynamic losses.

It was found that occurrences of vortex whistle could be minimized or avoided by using a plurality of second (irregular) guide vanes 44 at given circumferential positions. More specifically, the trailing edge shape of the plurality of second guide vanes 44 are different from the corresponding portion of the first (regular) guide vanes 34 in that they have a trailing edge recess 46 through which a flow having a strong radial component is allowed when the guide vanes (both regular and irregular) are pivoted to a certain extent towards the tangential orientation. It was found that by judiciously sizing and positioning these flows having a strong radial component, interference could be created with the surrounding tangential flows which could reduce or impede vortex whistle while causing a limited penalty in terms of aerodynamic losses. In particular, it was found that grouping a number of irregular guide vanes 44 adjacent to one another, and positioning the trailing edge recess 46 adjacent the hub 28 rather than adjacent the shroud 30, were two factors which could contribute to satisfactorily addressing whistle.

A number of examples of irregular guide vane designs 44, 50, 52, 54, 56 will now be presented. It will be noted that these guide vane designs have a trailing edge which have at least a portion which is recessed from an axial reference line 57 (parallel to leading edge) and which can provide a mean of generating flow disturbances (flow discontinuity) that can control the swirling flow vorticity strength to avoid or reduce the importance of whistle.

A first example of an irregular guide vane 44 design is presented in FIG. 3. This irregular guide vane 44 has a trailing edge 58 which extends obliquely relative to the orientation of the leading edge 36, thereby delimiting a trailing edge recess 46 by comparison with the regular guide vane 34 shown in FIG. 2, and where the trailing edge recess 46 area is concentrated on the side which is associated with the hub 28 of the radial-to-axial intake. Such an obliquely oriented trailing edge 58 will be referred to herein as "chamfered". More specifically, it will be noted that the dimension of the chord varies along the span of the inlet guide vane 44, thereby forming the trailing edge recess 46.

Figure 4:
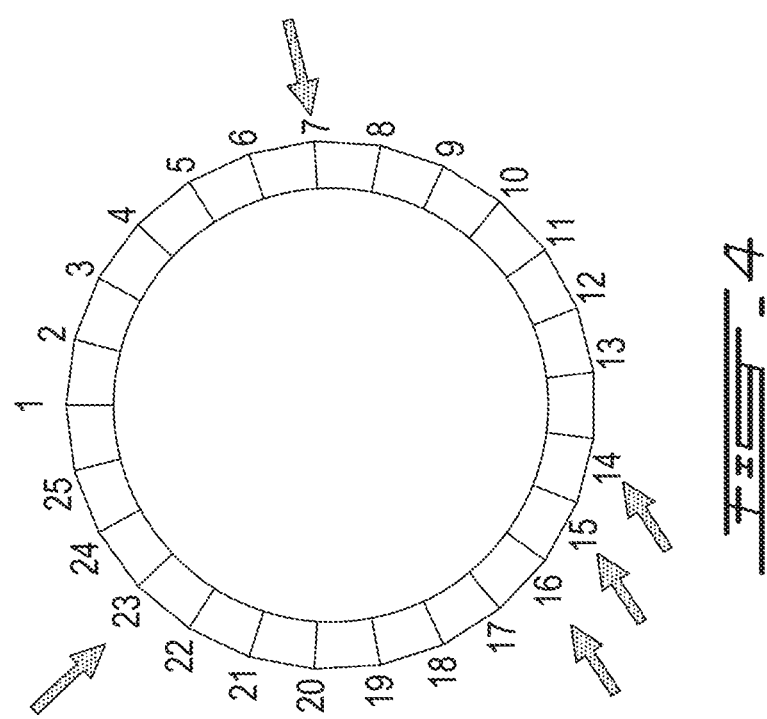

Referring to FIG. 4, irregular guide vanes 44 such as shown in FIG. 3 were used at circumferential positions 7, 14, 15, 16 and 23, as shown in FIG. 4 (the locations not indicated by arrows have regular guide vanes), of a Pratt & Whitney Canada turboshaft engine. Roughly, circumferential positions 12 to 18 are shown in FIG. 10. This test proved successful to addressing vortex whistle in the turboshaft engine by reducing it below a target level, while causing limited performance impact (aerodynamic losses). Irregular guide vanes 44 such as shown in FIG. 3 were also used at circumferential positions 7, 14, 15, 16 and 17 as shown in FIG. 5, of a gas turbine engine, which also resulted in eliminating the vortex whistle. In the configuration shown in FIG. 4, three irregular guide vanes are grouped, and two irregular guide vanes (located at positions 7 and 23) are spaced from any other irregular guide vane by several adjacent regular guide vanes. In the configuration shown in FIG. 5, four irregular guide vanes are grouped, and one irregular guide vane (located at position 7) is spaced from the group of irregular guide vanes by several adjacent regular guide vanes. In an alternate embodiment, only three or four adjacent irregular guide vanes can be used. Results with a given irregular vane shape and with a given irregular vane number/configuration, can vary depending on angle, mass flow, and size in the specific gas turbine. To adapt the irregular guide vanes 44 to a different gas turbine, one may wish to begin by introducing a single irregular guide vane 44, testing the configuration, and subsequently adding irregular guide vanes 44 and testing, until a whistle reduction reaching a desired target has been reached. Typically, the number of irregular guide vanes 44 used will be minimized to the extent that the target is reached.

While grouping several adjacent ones of the irregular guide vanes 44 (and their associated through flows having a strong radial component) was found efficient during testing, it will be understood that other configurations than those shown in FIGS. 4 and 5 can be suitable in alternate embodiments.

During operation of the gas turbine 10, the inlet guide vanes are collectively oriented in an oblique orientation, between a radial orientation and a tangential orientation, a tangential flow of gas is aspired between corresponding adjacent ones of said inlet guide vanes; and a radial flow of gas is allowed across the trailing edge recess formed in one or more of the inlet guide vanes. The radial flow of gas interferes with the tangential flow of gas in a manner which can satisfactorily prevent whistle.

A guide vane design which will be referred herein as "partially chamfered" was also successfully tested in the configuration shown in FIG. 4 on a gas turbine engine. More specifically, rather than having a trailing edge which entirely extends obliquely, such as shown in the full lines of FIG. 3, the partially chamfered design has a first trailing edge portion 60 which extends parallel to the leading edge 36, and a second trailing edge portion 62 which extends obliquely. The trailing edge recess 64 is thus defined by the second trailing edge portion 62 which was, in this embodiment, positioned on the hub side of the inlet guide vane 44. In this embodiment, the first trailing edge portion 60 and the second trailing edge portion 62 each make up about 50% of the entire trailing edge span, but different proportions are possible in alternate embodiments.

Turning now to FIG. 6, another guide vane design 50 is shown. In this embodiment, the trailing edge recess is rectangular, and can be said to extend along a given span L and a given depth D of the blade. In this embodiment, the rectangular trailing edge recess 46 was positioned adjacent the hub. The span L of the rectangular trailing edge recess can represent between 0.2-0.5 of the span S of the blade (e.g. of the leading edge) for instance, whereas the ratio of the depth D of the rectangular trailing edge recess to the span L can be of between 1 and 5, for instance. Based on the testing which was done and presented above, and on the inventor's experience and knowledge, it is believed that this design can be satisfactory at least in some embodiments.

Turning now to FIG. 7, another guide vane design is shown. In this embodiment, a first rectangular trailing edge recess is used on the hub side, and a supplemental rectangular trailing edge recess 68 is used on the shroud side. The trailing edge recesses 46, 68 can be configured in a manner to generate vortexes. In this case, each one of the two trailing edge recesses 46, 68 can have a span corresponding to between 0.1 and 0.3 of the span S of the blade. In FIGS. 6 and 7, the trailing edge recesses 46, 68 form a square angle, but it will be understood that in alternate embodiments, the trailing edge recess(es) can be formed of oblique edges and form a different angle. Based on the testing which was done as presented above, and on the inventor's experience and knowledge, it is believed that this design can be satisfactory at least in some embodiments.

Figure 9:
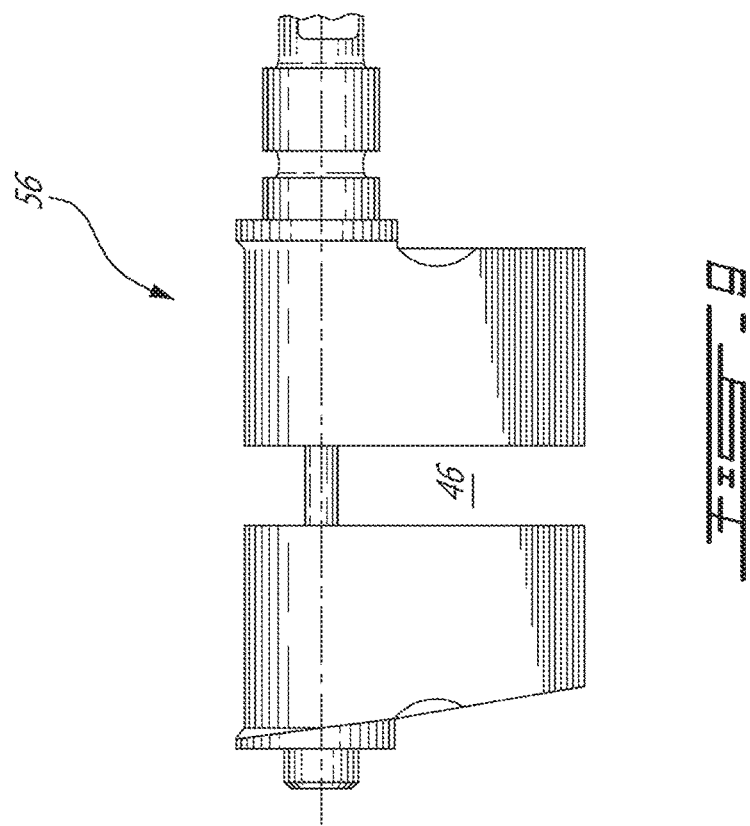
FIG. 9 is a side elevation view of a second inlet guide vane, in accordance with a fifth embodiment.
Figure 8:
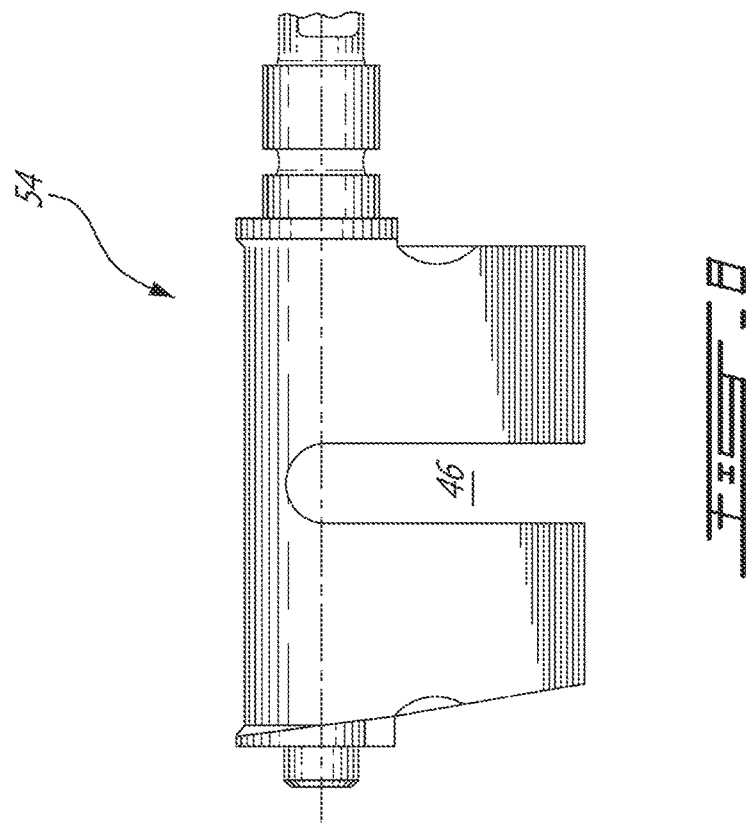
FIG. 8 is a side elevation view of a second inlet guide vane, in accordance with a fourth embodiment.

FIG. 8 and FIG. 9 are two other examples of guide vane designs with rectangular trailing edge recesses which may be satisfactory in some embodiments.

In the embodiments shown in FIG. 3. and FIGS. 6 to 9, while a trailing edge recess if formed in the blade, the blade is unapertured. It was found that the ratio of second inlet guide vanes could represent around 20-100% (in the case of 100% the trailing edge recess would likely be reduced in size), preferably below 40%, of the total number of inlet guide vanes.

The above description is meant to be exemplary only, and one skilled in the art will recognize that changes may be made to the embodiments described without departing from the scope of the invention disclosed. For example, in the embodiments presented above, the first inlet guide vanes are identical to one another, and the second inlet guide vanes are identical to one another, but it will be understood that the second inlet guide vanes can be different from one another in alternate embodiments. It is believed that the solution described herein can be satisfactorily used in various forms of gas turbines having radial-to-axial intake such as gas turbine engines, auxiliary power units, etc. The solution can be incorporated to new gas turbines, or retrofitted to existing gas turbines, such as if a need arises from the field. While the embodiments presented above included the irregular vanes as only a portion. Still other modifications which fall within the scope of the present invention will be apparent to those skilled in the art, in light of a review of this disclosure, and such modifications are intended to fall within the appended claims.

The invention claimed is:

1. A gas turbine comprising a radial-to-axial intake extending between a hub and a shroud, a plurality of inlet guide vanes being interspaced from one another around a circumference of the radial-to-axial intake, the plurality of inlet guide vanes each having a blade having a leading edge, a trailing edge, a span extending along the leading edge, and pivot members at opposite ends of the blade to pivotally mount the blade about a pivot axis across the radial-to-axial intake via the pivot members, the pivot axis extending axially across a radial portion of the radial-to-axial intake, the plurality of inlet guide vanes including a plurality of first inlet guide vanes and a plurality of second inlet guide vanes, said plurality of second inlet guide vanes having a trailing edge shape defined by a chord length variation along the span of the plurality of second inlet guide vanes differing from a trailing edge shape of the first inlet guide vanes, the plurality of second inlet guide vanes forming a trailing edge recess.

2. The gas turbine engine of claim 1 wherein the plurality of second inlet guide vanes include a group of at least two adjacent second inlet guide vanes.

3. The gas turbine engine of claim 2 wherein the plurality of second inlet guide vanes include a group of three or four adjacent second inlet guide vanes.

4. The gas turbine engine of claim 2 wherein the plurality of second inlet guide vanes further includes at least one second inlet guide vane separated from all other second inlet guide vanes by the plurality of first inlet guide vanes.

5. The gas turbine engine of claim 1 wherein the trailing edge recess is located adjacent to the hub of the radial-to-axial intake.

6. The gas turbine engine of claim 5 wherein the trailing edge recess of the second inlet guide vanes is provided in the form of a chamfer extending along at least a portion of the span of the corresponding second inlet guide vanes.

7. The gas turbine engine of claim 6 wherein the chamfer extends along at least half of the span of the corresponding second inlet guide vanes.

8. The gas turbine engine of claim 6 wherein the chamfer extends along the entire span of the corresponding second inlet guide vanes.

9. The gas turbine engine of claim 5 wherein the trailing edge recess is rectangular and extends along a given span and a given depth of the blade.

10. The gas turbine engine of claim 5 wherein the second inlet guide vanes further comprise a supplemental trailing edge recess located adjacent to the shroud of the radial-to-axial intake.

11. The gas turbine engine of claim 5 wherein the trailing edge recess is rectangular and extends along a given span of the blade.

12. A method of operating a gas turbine having a radial-to-axial intake extending between a hub and a shroud, a plurality of inlet guide vanes being interspaced from one another around a circumference of the radial-to-axial intake, the method comprising:
    collectively orienting each one of the plurality of inlet guide vanes in an oblique orientation, between a radial orientation and a tangential orientation;
    aspiring a tangential flow of gas between corresponding adjacent ones of said inlet guide vanes; and
    aspiring a radial flow of gas across a trailing edge recess formed in at least one of said plurality of inlet guide vanes.

13. The method of claim 12 wherein said aspiring a radial flow of gas includes aspiring a radial flow of gas across the trailing edge recess formed in at least two adjacent ones of said plurality of inlet guide vanes.

14. The method of claim 13 wherein said aspiring a radial flow of gas includes aspiring a radial flow of gas across three or four adjacent ones of said plurality of inlet guide vanes.

15. The method of claim 13 wherein said aspiring a radial flow of gas includes aspiring a plurality of radial flows of gas across a corresponding plurality of circumferentially interspaced trailing edge recesses.

16. An inlet guide vane extending through a fluid passage defined between a hub and a shroud, comprising a blade having a leading edge, a trailing edge and a span extending along the leading edge; a hub pivot engagement member pivotally mounted to the hub and a shroud pivot engagement member pivotally mounted to the shroud, the hub pivot engagement member and the shroud pivot engagement member positioned at opposite ends of the blade, adjacent the leading edge; and a trailing edge recess fluidly connected to the fluid passage to allow a fluid circulating in the fluid passage to pass through the trailing edge recess, a length of the trailing edge recess in a spanwise direction being at least about 10% of a span of the blade.

17. The inlet guide vane of claim 16 wherein the trailing edge recess of the inlet guide vane is located adjacent to the hub pivot engagement member.

18. The inlet guide vane of claim 17 wherein the trailing edge recess of the inlet guide vane is delimited by a portion of the trailing edge which extends obliquely relative to the leading edge.

19. The inlet guide vane of claim 17, wherein the inlet guide vane further comprises a supplemental trailing edge recess located adjacent to the shroud pivot engagement member.

20. The inlet guide vane of claim 16 wherein the trailing edge recess is rectangular.

\* \* \* \* \*